United States Patent Office 3,072,602
Patented Jan. 8, 1963

3,072,602
THERMOPLASTIC COMPOSITIONS HAVING IMPROVED LIGHT STABILITY
Gerald A. Clark and Carl B. Havens, Midland, Mich., assignors to The Dow Chemical Company, Midland, Mich., a corporation of Delaware
No Drawing. Filed July 2, 1959, Ser. No. 824,477
12 Claims. (Cl. 260—45.85)

This invention relates to new and improved compositions of resinous organic materials. More particularly, it relates to compositions of such materials having improved stability to the degradative effects of light.

This application is a continuation-in-part of U.S. Serial No. 544,819, filed November 3, 1955, and now abandoned.

Thermoplastic compositions, particularly those prepared from haloethylene polymers, have found wide acceptance as useful materials for making foils, fibers, filaments and other articles. The articles so produced are inherently strong, dimensionally stable, relatively inert to common household solvents, and are easily colored for an attractive appearance. However, such articles are subject to rapid and severe degradation and consequent discoloration due to the effects of heat and light. The problem becomes most serious when polymeric compositions are employed as filamentary materials in making window curtains, automobile seat covers, and other articles which are exposed for prolonged periods of time to direct sunlight. To overcome this disadvantage it has become most practical to incorporate certain additives into the composition to stabilize it to the effects of heat and to add other materials to the composition to stabilize it to the effects of light. Some of the prior light stabilizing materials have suffered from the disadvantages of bleeding out of articles made from vinyl or vinylidene halides. In addition, some of the materials are colored so that they impart an objectionable initial color which prevents the production of white articles. Further, many of the prior materials lose their effectiveness as light stabilizers after exposure to sunlight for a short time.

Degradation and discoloration are also evidenced when other resinous materials are subjected to prolonged exposure to light. Thus the known addition polymerizates such as polystyrene, polyethylene and the like, the known condensation interpolymers such as the polyamides and polyesters and the known synthetic cellulose derivatives such as the alkyl cellulose ethers and the cellulose esters each will exhibit some downgarding in physical and/or chemical properties from such exposure.

It is accordingly an object of this invention to provide improved compositions having increased resistance to the degradative effects of light.

It is a particular object to provide such a composition which is based on a resinous organic material and is resistant to the effects of light over prolonged periods of exposure to direct sunlight.

The above and related objects are accomplished by means of a composition comprising an organic resinous material and stabilizing quantities of a monoester of 4-benzoyl resorcinol having the following general formula:

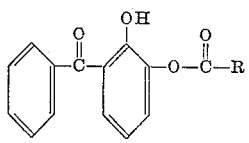

wherein R is selected from the group consisting of alkyl having from 1 to 8 carbon atoms, aryl and halogenated aryl. The compositions of this invention show effective resistance to the degradative effects of light even after prolonged exposure.

Among the specific compounds defined by the foregoing formula which have light stabilizing action in thermoplastic compositions and which are illustrative thereof are:

1-monoacetate-4-benzoyl resorcinol
1-monobenzoate-4-benzoyl resorcinol
1-mono(p-chlorobenzoate)-4-benzoyl resorcinol
1-mono-2-ethylhexoate-4-benzoyl resorcinol The resinous organic materials which may be stabilized in accordance with this invention may be selected from a wide variety of such substances. Thus any such material which evidences degradation upon exposure to ultraviolet light will be benefited by the use of the stabilizers defined above. For example the subject materials may be selected from the synthetic resinous addition polymers. Illustrative of these are the polymers and interpolymers of vinylidene chloride, vinyl chloride, styrene, acrylonitrile, vinyl acetate, vinyl propionate, and the alkyl, cycloalkyl, and aryl acrylates and methacrylates. The homopolymers of the above monomeric materials and the interpolymers resulting from the polymerization of two or more of the above are well known thermoplastic materials which find their way into diversified end uses for varying opportunities for light exposure. The resinous condensation polymers may also be stabilized in accordance with the invention. Representative of such polymeric materials are the polyamides including for example polyhexamethylene diadipamide and other condensate of dicarboxylic acids and diamines, and the polyesters such as polyethylene terephthalate and similar condensates of polycarboxylic acids and polyhydric alcohols. Also degradation due to light exposure is noted in many cellulose derivatives including typically the simple cellulose ethers, such as methyl cellulose and ethyl cellulose; the mixed cellulose ethers such as the alkyl hydroxyalkyl cellulose ethers; and the cellulose esters including cellulose acetate, cellulose butyrate and cellulose acetobutyrate. The stabilizers also find utility with those organic resinous materials commonly referred to as thermosetting polymers including for example the condensates of phenol with formaldehyde or urea and formaldehyde and like polymeric substances. Other resinous materials will be known. Also the stabilization efficiency of the claimed stabilizing agents will vary somewhat with the subject material because of the inherent sensitivity or stability of such material per se to light exposure. It may be stated that any resinous organic material which upon exposure to ultraviolet light shows evidence of degradation will be protected and benefited by the use of the instant stabilizing agents. Especially advantageous results are obtained when the haloethylene polymers such as the polymers of vinyl chloride, the copolymers of vinyl chloride and vinylidene chloride and the coploymers of vinylidene chloride with other copolymerizable monomers in which the vinylidene chloride is present in an amount of at least 50 percent of the copolymer are employed. The haloethylene polymers present an unusual problem in that one degradation has started the effect seems to be autocatalytic and thus the problem of stabilization is made more difficult.

The monoesters of this invention are easily prepared by the controlled esterification of 4-benzoyl resorcinol with the appropriate acid chloride. In a typical example of the preparation 0.5 mole of 4-benzoyl resorcinol and 0.5 mole of acetyl chloride were heated for two hours at 75°–80° C. in 500 ml. toluene and 75 ml. pyridine. The reaction mixture was cooled to room temperature, washed with water, dilute HCl and finally with water. The mixture was distilled to remove the toluene and the product recrystallized twice from alcohol. The 1-monoacetate-4-benzoyl resorcinol was in the form of pale yellow crystals melting at 93.6°–94° C. Other typical monoesters were likewise in the form of pale yellow crystals and had the following identifying characteristics: 1-monobenzoate-4-benzoyl resorcinol, M.P.=90° C.; 1-mono-2-ethylhexoate-4-benzoyl resorcinol, B.P. 195°–200° C. at 0.5 mm. Hg.

The monoesters may be employed in amounts of from 0.1 to 10 percent by weight based on the weight of the polymer, preferably from 0.25 to 3 percent by weight. Most polymeric compositions comprise many ingredients such as plasticizers, fillers, pigments, antioxidants, lubricants and heat stabilizers and the monoesters of this invention may be employed in such multi-component formulations in conjunction with such additives without any adverse effects. The necessity or desirability of such additives will be known to the skilled formulator. Likewise, the monoesters of this invention may be used in conjunction with and supplementary to other known light stabilizers such as salol, tertiary-butyl salol and the like.

The stabilizers of this invention may be incorporated into the compositions by blending or mixing with the resinous base by conventional milling or other mixing means prior to fabrication of the composition. The stabilization may also be incorporated into the formulation by other techniques as by dissolution into a spinning dope or the polymer, into a lacquer of the polymer, and into other dissolved form. The greatest stabilizing efficiency is usually attained by the use of blending prior to fabrication so that a uniform distribution of stabilizer throughout the fabricated article results. However beneficial results may be realized and may be of advantage when the stabilizer is incorporated by impregnation or diffusion into the already prepared article. In such case the stabilizer may be uniformly distributed or alternatively may be present in slightly greater concentration near the surface of the article. For example the stabilizers of the instant invention may be dissolved in a dye bath which is used to impregnate fibers and filaments. In such case the stabilizer is in an opportune location to protect both the polymer and the dye stuff from the effects of ultraviolet light. Other means of incorporating organic additives into resinous materials will be known and available to the skilled worker.

The compositions of this invention show superior resistance to degradation due to light over any previously known compositions. This superiority will be more apparent from the following illustrative examples in which all parts are by weight.

EXAMPLE 1

A series of four samples were made consisting of 90 parts of a copolymer prepared from a monomeric mixture consisting of 85 percent vinylidene chloride and 15 percent vinyl chloride, 7.0 parts of pentaerythritol tetraester of a mixture of saturated fatty acids as a plasticizer, 1.0 part of a known phosphate heat stabilizer, and 1.0 part of titanium dioxide. To each of three of the four samples was added 1.0 part of one of the monoesters of this invention as listed in Table I. To the fourth was added 1 part of 2-hydroxy-5-chlorobenzophenone, a known light stabilizer. The ingredients were milled on a two mill roll and then melt extruded as a 10 mil monofilament. The monofilaments were exposed to direct sunlight in the State of Arizona until a given amount of discoloration was attained. The results are listed in Table I.

Table I

| Light Stabilizer | Ultraviolet sun hrs. to reach standard browning |
| --- | --- |
| 1. 1-mono-2-ethylhexoate-4-benzoyl resorcinol | 625 |
| 2. 1-monoacetate-4-benzoyl resorcinol | 750 |
| 3. 1-monobenzoate-4-benzoyl resorcinol | 650 |
| 4. 2-hydroxy-5-chlorobenzophenone | 325 |

From the above results it can be seen that the monoesters of this invention provide considerably more resistance to ultraviolet light degradation as one of the most effective of the previously known light stabilizers.

EXAMPLE 2

A composition was prepared by blending polyhexamethylene diadipamide with 2 percent by weight of monobenzoyl resorcinol monobenzoate. One sample was left unstabilized for comparative purposes. The samples were molded into test specimens and subjected to 65 hours exposure under G.E. RS–1 sunlamps. The color change after exposure was noted and notched impact tests were run at room temperature. The results are listed in the following table. In the results of impact resistance a higher value indicates a proportionately greater resistance to impact.

Table II

| | Color | | Impact | |
| --- | --- | --- | --- | --- |
| | Before Exposure | After Exposure | Before Exposure | After Exposure |
| Unstabilized | grey | brown | 5.3 | 1.4 |
| Stabilized | yellow | no change | 6.0 | 1.7 |

EXAMPLE 3

A composition was prepared by blending 1 percent of monobenzoyl resorcinol monobenzoate with a glycol unsaturated polyester sold commercially as Polylite 8181 by the Reichold Chemical Company. Moldings were prepared and exposed to G.E. RS–1 sunlamps for 42 days. The color change was noted at 7, 28 and 42 days and the stability rated according to an arbitrary numerical scale wherein 0 equals no apparent color and 5 equals a bright yellow. The results are noted below in Table III.

Table III

| | 7 days | 28 days | 42 days |
| --- | --- | --- | --- |
| Unstabilized | 3.0 | 4.5 | 5.5 |
| Stabilized | 1.0 | 1.5 | 3.0 |

EXAMPLE 4

A composition was prepared by blending 0.5 percent of monobenzoyl resorcinol monobenzoate with a mass polymerized copolymer of 70 percent styrene and 30 percent acrylonitrile. One sample was left unstabilized as a blank. The samples were prepared into suitable test specimens and exposed to direct sunlight in the State of Florida with the samples facing south at 45°. Determination of tensile strength, elongation and notched impact was made. The results are listed in Table IV.

Table IV

| | Tensile strength (p.s.i.) | | Elong. (percent) | | Impact | |
| --- | --- | --- | --- | --- | --- | --- |
| | Before Exposure | After Exposure | Before | After | Before | After |
| Unstabilized | 10,100 | 3,860 | 2.35 | 0.7 | 0.5 | 0.3 |
| Stabilized | 9,490 | 7,280 | 2.10 | 1.3 | 0.48 | 0.40 |

EXAMPLE 5

Test samples were prepared from a composition consisting of 0.5 percent of monobenzoyl resorcinol monobenzoate and a copolymer resulting from the mass polymerization of about 67 percent methyl methacrylate and 33 percent styrene. A comparative sample was prepared from the above copolymer with 0.5 percent of phenyl salicylate. An unstabilized sample was used for purposes of further comparison. Test samples were prepared and were exposed to direct sunlight for 12 months at 45° while facing south in the State of Florida. Determinations of tensile strength and elongation were made. The results are noted in Table V.

Table V

|  | Tensile Strength (p.s.i.) | | Elongation (percent) | |
|---|---|---|---|---|
|  | Before | After | Before | After |
| Unstabilized | 9,820 | 4,290 | 3.4 | 0.9 |
| Phenyl salicylate | 10,160 | 3,600 | 3.9 | 0.7 |
| Monobenzoyl resorcinol monobenzoate | 10,160 | 5,700 | 4.0 | 1.2 |

The above results indicate the superiority of the stabilizers of this invention to protect resinous materials over a traditional light absorbing agent.

EXAMPLE 6

A composition was prepared by blending 1 percent of a monobenzoyl resorcinol monobenzoate with an organo soluble ethyl celulose. One sample was left unstabilized as a blank. Films of 0.025 inch in thickness were cast from organic solution. The films were exposed for 2 hours under a G.E. AH-6 Mercury lamp. The films were analyzed by infrared technique for rate of carbonyl development. The results are listed in Table VI wherein a lower value indicates less photo degradation.

Table VI

Unstabilized _____ 0.075
Stabilized _____ 0.025

The monoesters of this invention are light stabilizers for all resinous organic materials which are normally subject to discoloration from exposure to ultraviolet light. In addition to the materials listed in the examples these monoesters exhibit a similar effect when incorporated into compositions based upon the polyolefines including polyethylene, polypropylene and copolymers of ethylene and propylene; polyvinyl chloride and copolymers of vinyl chloride with vinyl acetate, acrylonitrile, vinylidene chloride and other monoethylenically unsaturated comonomers; the polymers and copolymers of styrene and vinyl toluene with other comonomers including butadiene, α-methyl styrene and alkyl acrylates; the polymers and interpolymers of vinylidene chloride with comonomers including vinyl acetate, vinyl propionate, acrylonitrile, alkyl acrylates and alkyl methacrylates; and the synthetic cellulose derivatives, including the cellulose esters and specifically cellulose acetate, cellulose butyrate and cellulose acetobutyrate, and the cellulose ethers including methyl cellulose and hydroxy ethyl cellulose. Stabilization benefits are realized when these monoesters are incorporated into any other thermoplastic film or fiber forming compositions.

We claim:

1. A light stable composition of matter consisting essentially of an organic thermoplastic synthetic polymeric material normally subject to discoloration on exposure to light and from 0.1 to 10 percent of the weight of said resinous organic material of a monoester of 4-benzoyl resorcinol as a stabilizer having the general formula:

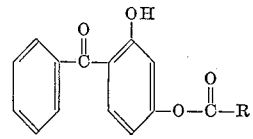

wherein R is selected from the group consisting of alkyl having from 1 to 8 carbon atoms, phenyl and chlorophenyl.

2. The composition claimed in claim 1, wherein the monoester is 1-monoacetate-4-benzoyl resorcinol.

3. The composition claimed in claim 1, wherein the monoester is 1-mono-(2-ethylhexoate)-4-benzoyl resorcinol.

4. The composition claimed in claim 1, wherein the monoester is 1-monobenzoate-4-benzoyl resorcinol.

5. The composition claimed in claim 1, wherein said organic thermoplastic synthetic polymeric material is an addition polymer.

6. The composition claimed in claim 5, wherein said addition polymer is a monoethylene copolymer consisting of at least 50 percent by weight of vinylidene chloride with any remainder of a monoethylenically unsaturated comonomer.

7. The composition claimed in claim 1, wherein said organic thermoplastic synthetic polymeric material is a condensation polymer.

8. The composition claimed in claim 7, wherein said condensation polymer is a polyamide.

9. The composition claimed in claim 7, wherein said condensation polymer is a polyester.

10. The composition claimed in claim 1, wherein said organic thermoplastic synthetic polymeric material is a synthetic cellulose derivative.

11. The composition claimed in claim 10, wherein said synthetic cellulose derivative is an alkyl cellulose ether.

12. The composition claimed in claim 10, wherein said synthetic cellulose derivative is a cellulose ester.

References Cited in the file of this patent

UNITED STATES PATENTS

| 2,445,739 | Rowland et al. | July 20, 1948 |
| 2,568,894 | Mackey | Sept. 25, 1951 |
| 2,686,812 | Wynn et al. | Aug. 17, 1954 |
| 2,735,783 | Tamblyn et al. | Feb. 21, 1956 |
| 2,898,323 | Clark | Aug. 4, 1959 |

OTHER REFERENCES

Berry et al.: "Modern Plastics," vol. 25, page 154, October 1947.

UNITED STATES PATENT OFFICE
CERTIFICATE OF CORRECTION

Patent No. 3,072,602                                        January 8, 1963

Gerald A. Clark et al.

It is hereby certified that error appears in the above numbered patent requiring correction and that the said Letters Patent should read as corrected below.

Column 1, lines 63 to 69, the formula should appear as shown below instead of as in the patent:

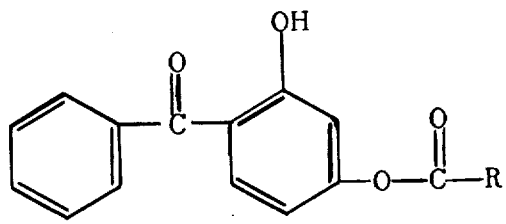

Signed and sealed this 6th day of August 1963.

(SEAL)
Attest:
ERNEST W. SWIDER
Attesting Officer

DAVID L. LADD
Commissioner of Patents